US009163782B2

United States Patent
Kerr, Jr.

(10) Patent No.: US 9,163,782 B2
(45) Date of Patent: *Oct. 20, 2015

(54) SUPPORT BRACKET FOR SUPPORTING AN ELECTRICAL BOX

(76) Inventor: Jack R. Kerr, Jr., Hearne, TX (US)

( * ) Notice: Subject to any disclaimer, the term of this patent is extended or adjusted under 35 U.S.C. 154(b) by 163 days.

This patent is subject to a terminal disclaimer.

(21) Appl. No.: 13/462,241

(22) Filed: May 2, 2012

(65) Prior Publication Data

US 2013/0075555 A1 Mar. 28, 2013

Related U.S. Application Data (60) Provisional application No. 61/481,374, filed on May 2, 2011.

(51) Int. Cl.
| | |
|---|---|
| *B42F 13/00* | (2006.01) |
| *F16M 13/02* | (2006.01) |
| *H02G 3/12* | (2006.01) |

(52) U.S. Cl.
CPC ............. *F16M 13/022* (2013.01); *H02G 3/125* (2013.01)

(58) Field of Classification Search
CPC .... H02G 3/125; H02G 3/288; Y10S 248/906; E04B 2002/7488; G01B 5/0004
USPC .......... 248/214, 317, 322, 342, 343, 344, 903
See application file for complete search history.

(56) References Cited

U.S. PATENT DOCUMENTS

| | | | | | |
|---|---|---|---|---|---|
| 2,375,513 | A | * | 5/1945 | Bach | 248/59 |
| 2,468,995 | A | * | 5/1949 | Morrison | 248/346.03 |
| 2,732,162 | A | * | 1/1956 | McKinley | 248/343 |
| 3,597,889 | A | * | 8/1971 | Lo Nigro | 52/28 |
| 4,717,099 | A | * | 1/1988 | Hubbard | 248/57 |
| 6,098,945 | A | * | 8/2000 | Korcz | 248/343 |
| 6,256,950 | B1 | * | 7/2001 | Laukhuf et al. | 52/239 |
| 2005/0001123 | A1 | * | 1/2005 | Cheatham et al. | 248/298.1 |
| 2005/0067546 | A1 | * | 3/2005 | Dinh | 248/343 |

* cited by examiner

*Primary Examiner* — Shin Kim
(74) *Attorney, Agent, or Firm* — Michael Diaz (57) ABSTRACT

A support bracket for supporting an electrical box between two supports. The support bracket is used with a mounting assembly. The mounting assembly includes two elongated members each having an end mount. The elongated members are slidably coupled to each other, thereby allowing the mounting assembly to be telescopically extended. The support bracket is affixed to the one of the elongated members for supporting an electrical box and includes a planar surface and a slot having a plurality of extended clamps. The clamps are positioned and deformed within an inner lip of one of the elongated members. The bracket also includes a plurality of perpendicular extensions and a support rod affixed to the planar surface and positioned over at least one of the elongated members. The support rod is also affixed to the electrical box thereby providing support to the electrical box.

14 Claims, 7 Drawing Sheets

SUPPORT BRACKET FOR SUPPORTING AN ELECTRICAL BOX

RELATED APPLICATIONS

This utility application claims the benefit of U.S. Provisional Patent Application Ser. No. 61/481,374 filed May 2, 2011 by Jack R. Kerr, which is hereby incorporated by reference.

BACKGROUND OF THE INVENTION

1. Field of the Invention

This invention relates to support assemblies. Specifically, and not by way of limitation, the present invention relates to a support bracket for supporting electrical boxes.

2. Description of the Related Art

In construction of houses and buildings, it is quite common to have electrical boxes mounted in the walls or ceilings. These electrical boxes provide support and storage of various wiring devices, lighting fixtures, fans, and many other devices useful in a building. Electrical boxes also provide a space for electrical connections between the wiring device or fixture and the wiring of the building. These electrical boxes are normally attached to one or more structural supports, such as joists or studs. Often the electrical boxes include brackets for directly attaching the electrical box to the support member, while other electrical boxes are attached to a hanger or other support assembly which extends between a pair of adjacent structural supports.

Figure 1:
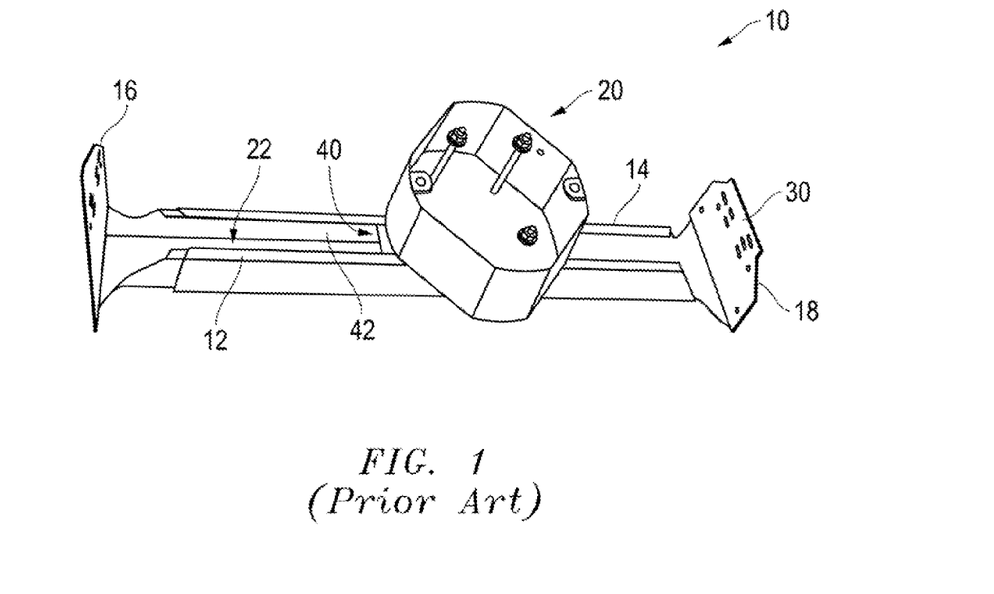
FIG. 1 (prior art) is a bottom perspective view of an existing mounting assembly.

There are various mounting assemblies which are currently used for supporting ceiling fans or other fixtures between a pair of structural supports. These assemblies are usually attached to the ceiling joists by a brace, a bar hanger or other suitable member extending between the joist. FIG. 1 is a bottom perspective view of an existing mounting assembly 10. The mounting assembly includes two elongated members 12 and 14 interconnected in such a manner as to telescopically extend. The elongated members include end mounts 16 and 18 located on opposing ends of the mounting assembly. The end mounts 16 and 18 typically extend perpendicular to the elongated members. An electrical box 20 is slidably attached to a bottom side 22 of the elongated members. The electrical box is typically supported by a support bracket 40 which is affixed on the bottom of the elongated members. However, the brace typical is attached on inner lips 42 of the elongated members. Because of the small surface area, this is a weak point for supporting the electrical box and any other fixture, such as a light/fan fixture.

The elongated members are expanded to engage adjacent structural supports or joists (not shown). The elongated members are expanded until the end mounts 16 and 18 frictionally engage the structural supports or ceiling joists. Other mounting braces may also include sharp prongs or teeth which are driven into the joists by force.

Although the existing mounting assemblies are acceptable in many applications, the support brackets are limited in the amount of weight they can support because of the position and point of force on the lips 42 of the elongated members.

Therefore, it would be advantageous to have a support bracket for a mounting assembly which provides greater support. It is an object of the present invention to provide such an apparatus.

SUMMARY OF THE INVENTION

In one aspect, the present invention is a support bracket for supporting an electrical box between two supports. The support bracket is used with a mounting assembly. The mounting assembly includes two elongated members each having an end mount. The elongated members are slidably coupled to each other, thereby allowing the mounting assembly to be telescopically extended. The support bracket is affixed to the one of the elongated members for supporting an electrical box and includes a planar surface and a slot having a plurality of extended clamps. The clamps are positioned and deformed within an inner lip of one of the elongated members. The bracket also includes a plurality of perpendicular extensions and a support rod affixed to the planar surface and positioned over at least one of the elongated members. The support rod is also affixed to the electrical box thereby providing support to the electrical box.

DESCRIPTION OF THE INVENTION

Figure 2:
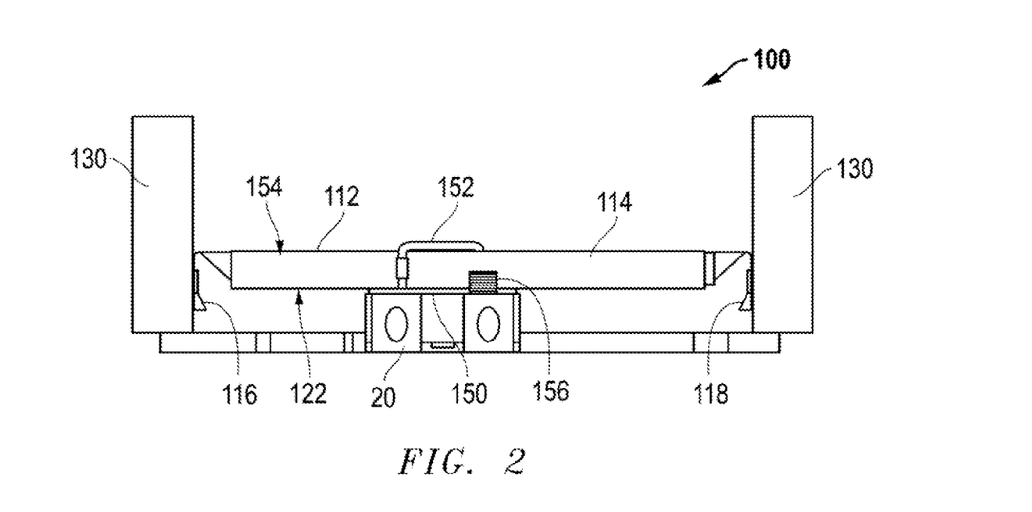
FIG. 2 is a side view of a mounting assembly for supporting the electrical box in the preferred embodiment of the present invention.

The present invention is a support bracket for a mounting assembly for a light or fan fixture. FIG. 2 is side view of a mounting assembly 100 for supporting the electrical box 20 in the preferred embodiment of the present invention. The mounting assembly includes two elongated members 112 and 114 interconnected to telescopically extend. Preferably the perimeter of one of the elongated members is slightly larger than the perimeter of the second elongated member, thereby allowing the members 112 and 114 to be slidably extended. The elongated members include end mounts 116 and 118 located on opposing ends of the mounting assembly. The end mounts 116 and 118 typically extend perpendicular to the elongated members. An electrical box 20 or any other item may be attached to a bottom side 122 of the elongated members. The mounting assembly 100 is affixed at the end mounts 116 and 118 to joists 130.

The electrical box 20 is affixed to the elongated members 116 and 118 by a support bracket 150. The support bracket includes a diagonally aligned support rod 152 extending over an upper side 154 of the elongated members 116 and 118. In addition, the support bracket includes perpendicular extensions 156 and 158 located on diagonally opposing sides.

Figure 3A:
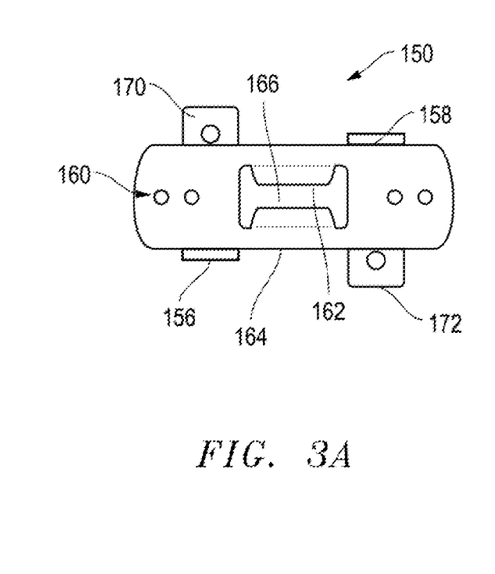
FIG. 3A is a top view of the support bracket of FIG. 2 without the support rod.
Figure 3B:
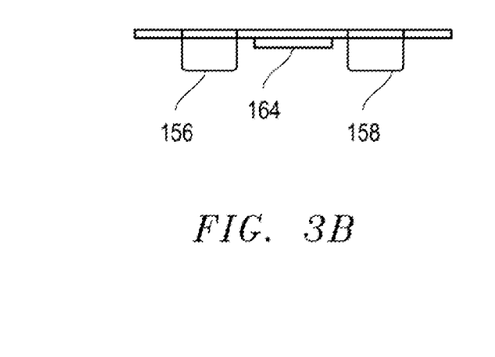
FIG. 3B illustrates a side view of the support bracket.
Figure 3C:
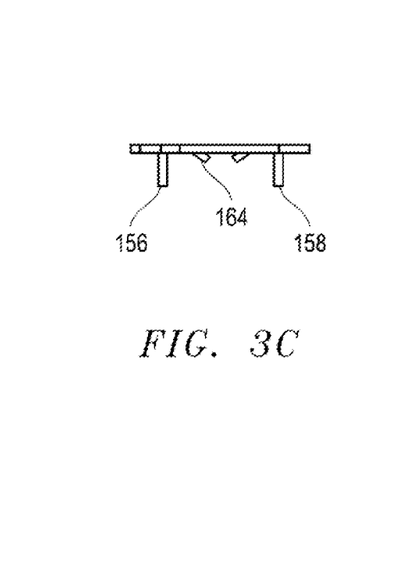
FIG. 3C illustrates a forward side view of the support bracket.
Figure 3D:
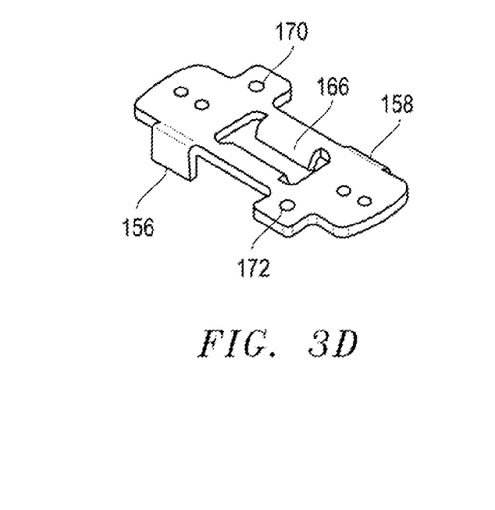
FIG. 3D illustrates a lower perspective view of the support bracket.

FIG. 3A is a top view of the support bracket 150 without the support rod 152. The support bracket includes a planar surface 160 having a slot 162 and two inwardly aligned clamps 164 and 166. The planar surface 160 also includes planar extensions 170 and 172 providing an area to affix the support rod to the support bracket. The planar extensions are located on diagonally opposing ends. In addition, the perpendicular extensions are located on diagonally opposing ends opposite the planar extensions. FIG. 3B illustrates a side view the support bracket 150. FIG. 3C illustrates a forward side view of the support bracket. FIG. 3D illustrates a lower perspective view of the support bracket.

Figure 4:
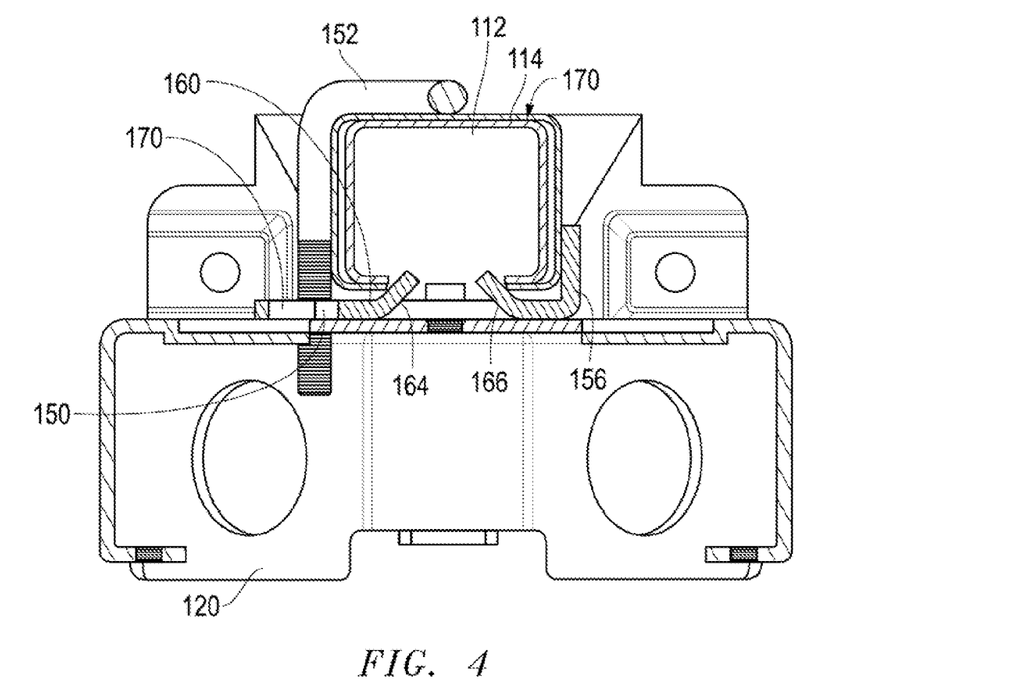
FIG. 4 is a cross-sectional view of the support bracket affixed to the elongated members.

FIG. 4 is a cross-sectional view of the support bracket 150 affixed to the elongated members 112 and 114. FIG. 4 shows only one side of the support rod 152. The support rod 152 is affixed on one side at planar extension 170 and conforms to the upper side 154 of the outer surface of the elongated members. The support rod is affixed to the diagonally opposing planar extension 172 (not shown in FIG. 4). The support rod is also affixed to an upper surface of the electrical box 20. The clamps 164 and 166 are positioned against the inner lips 42 of the elongated members. To prevent movement of the bracket and electrical box caused by torque, the perpendicular extensions 156 and 158 lie flush against side walls of the elongated members. When the bracket is clamped down between the electrical box and the elongated members, the clamps are deformed upon the inner lips 42 of the support members, thereby holding the bracket in place relative to the elongated members and the electrical box 20.

Figure 5:
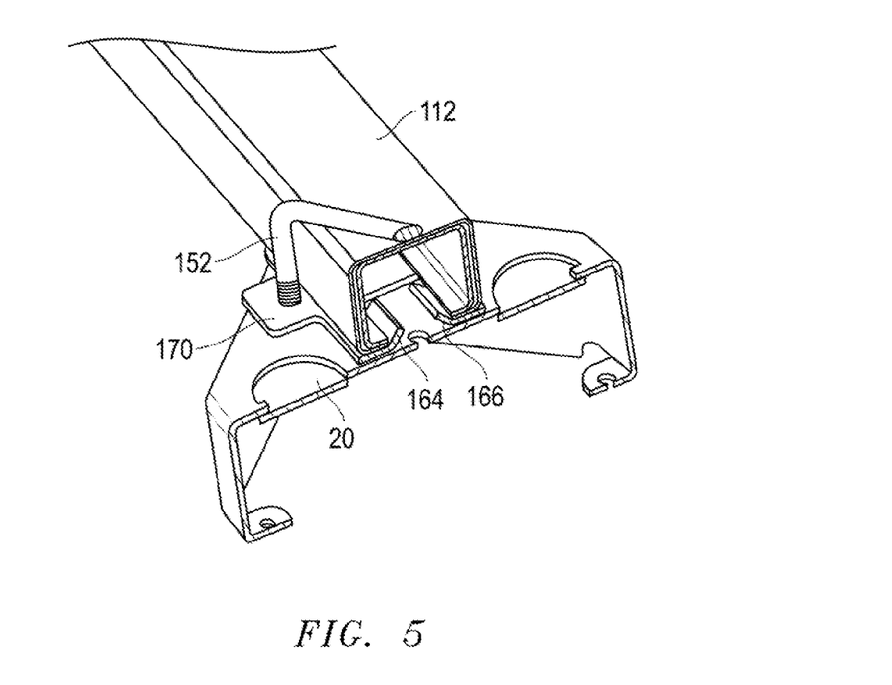
FIG. 5 is a partial top perspective view of the bracket showing one side of the support rod.
Figure 10:
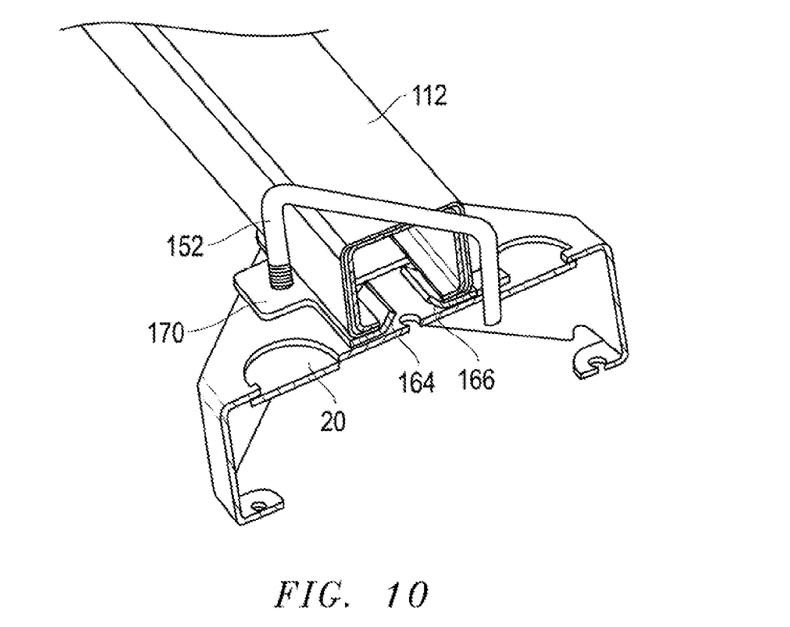
FIG. 10 is a top perspective view of the bracket showing both sides of the support rod.
Figure 11:
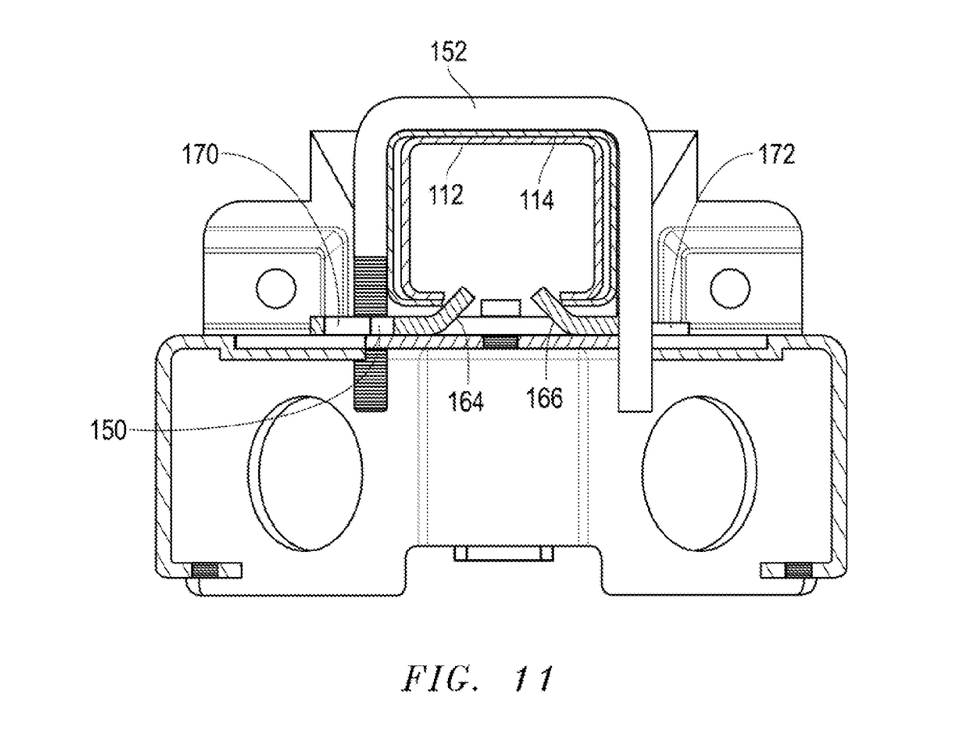
FIG. 11 is a cross-sectional view of the support bracket affixed to the elongated members illustrating the support rod.

FIG. 5 is a partial top perspective view of the bracket 150 showing one side of the support rod 152. The support rod 152 is shown affixed on only planar extension 170 for simplicity in illustration. Preferably, the support rod is also affixed on the other side at the planar extension 172. FIG. 10 is a top perspective view of the bracket showing both sides of the support rod. FIG. 11 is a cross-sectional view of the support bracket affixed to the elongated members illustrating the support rod.

Figure 6:
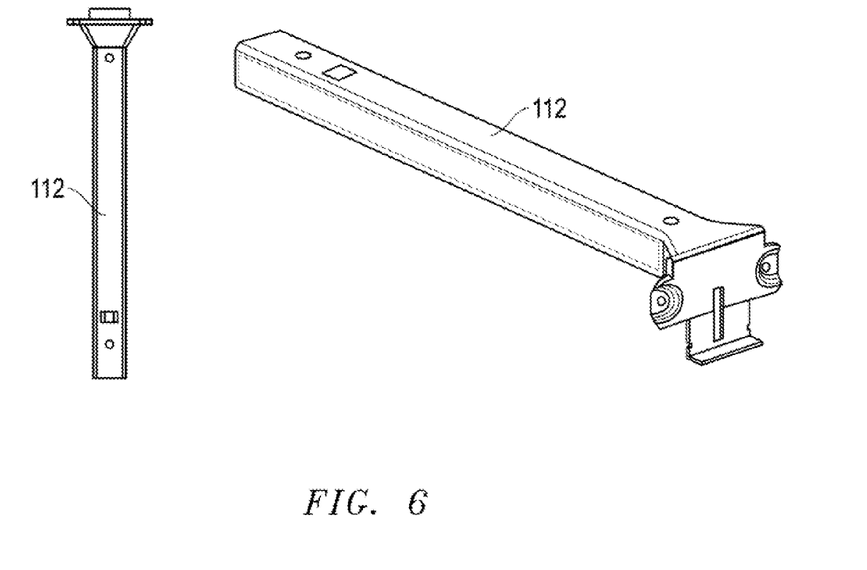
FIG. 6 is a top and front perspective view of one of the elongated members.
Figure 7:
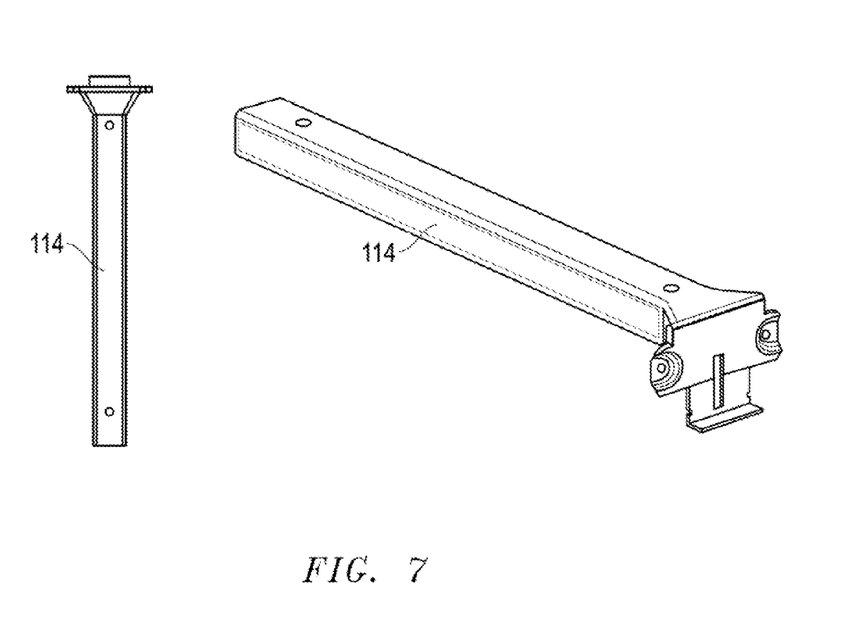
FIG. 7 is a top and front perspective view of one of the elongated members.
Figure 8:
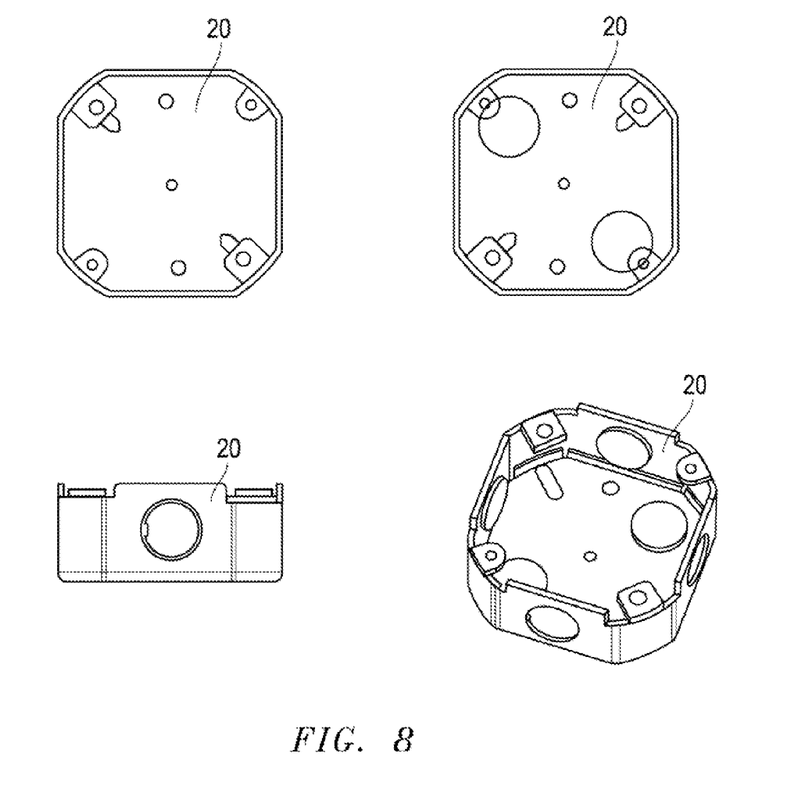
FIG. 8 illustrates a bottom view, a top view, and a side view of the electrical box.

FIG. 6 is a top and front perspective view of one of the elongated members 112. FIG. 7 is a top and front perspective view of one of the elongated members 114. FIG. 8 shows bottom, top, and side views of the electrical box 20.

With reference to FIGS. 2-8, the operation of the support bracket 150 will now be explained. The elongated members 112 and 114 are telescopically adjusted to allow end mounts 116 and 118 to be affixed to joists 130. The support bracket 150 is affixed to the elongated members. The support rod 152 is positioned over the upper side of the elongated members and affixed to the planar extensions 170 and 172 and an upper surface of the electrical box 20. The electrical box and planar extensions 170 and 172 may include aligned holes to allow a threaded portion of the support rod to be attached to both the bracket and the electrical box. As the bracket is clamped down by a nut or other fastening means, the clamps 164 and 166 are deformed upon the upper lips 42 of the lower side of the elongated members. In addition, to prevent movement of the bracket, the bracket includes perpendicular extensions 156 and 158 resting against opposing side walls of the elongated members.

The bracket enables support of the electrical box or other fixture (fan or light) by running the support rod over the elongated members. By supporting the bracket above the elongated members, the mounting assembly may hold far more weight than existing mounting assemblies.

In addition, the elongated members may be designed to be used with different depths of electrical boxes. The electrical boxes typically come in various standard sizes (e.g., pancake, 1 and ½ inch, and 2 and ⅛ inch) for which the mounting assembly may accommodate by adjusting height gages. In one embodiment, the height gages are each attached to a threaded bolt or screw. Turning the screw lowers or raises the height gage. The height gage may be held in place alongside the end mounts by a bracket. Preferably the bracket includes a slot sized and shaped to enable the height gage to slide vertically.

Figure 9:
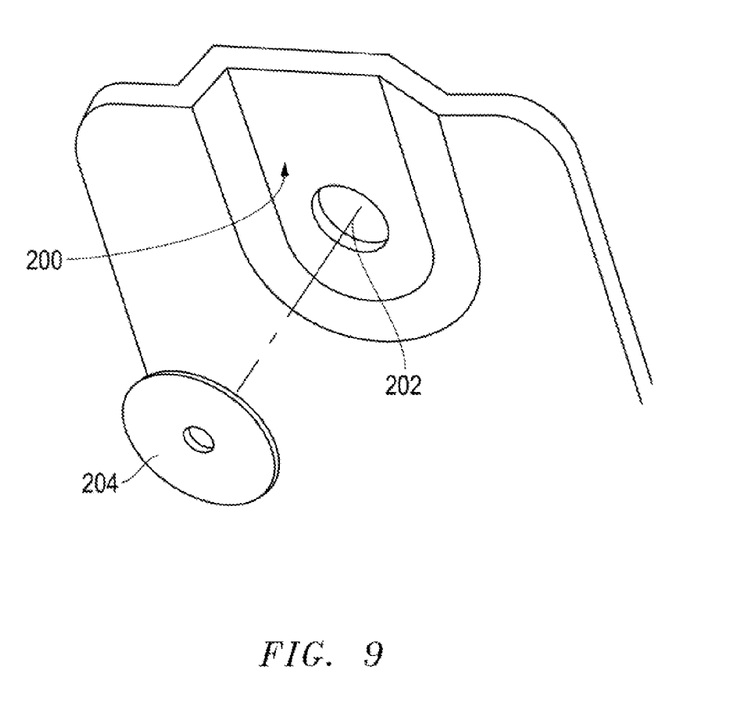
FIG. 9 is a front perspective view of a screw receiving section.

The height gage may include a foot section which enables a support structure (e.g., joist, dry wall section, etc) to lie flush against the attached mounting assembly. FIG. 9 is a front perspective view of a screw receiving section 200 which includes an orifice 202 for receiving and retaining a screw (not shown). In one embodiment, the receiving section 200 may include an insert 204 for retaining a screw when mounting the end mount to a joist or other support structure. The insert prevents the screw from falling out when aligning the end mount by holding the screw in place when partially inserted through the insert lying at the orifice 202.

The present invention is not limited to supporting an electrical box and may be used to support other devices such as electrical fans and light fixtures. Furthermore, the present invention may be configured in any shape which enables the support rod to be positioned over the elongated members and still remain in the scope of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A mounting assembly (100) for supporting an electrical box, the mounting assembly (100) comprising:
   a first elongated member (112) having an end mount (116) on a first end, the first elongated member (112) having a hollow interior and a perimeter on a second end;
   a second elongated member (114) having an end mount (118) on a first end, the second elongated member (114) having a hollow interior and a perimeter on a second end sized and shaped to receive the second end of the first elongated member (112);
   wherein the first and second elongated members are slidably coupled to enable a telescopic extension of the mounting assembly (100); and
   a support bracket (150) affixed to the one of the elongated members for supporting an electrical box (20), the support bracket having:
   a planar surface (160) and a slot (162) having a plurality of extended clamps (164, 166);
   a plurality of perpendicular extensions (156, 158); and
   a support rod (152) affixed to the planar surface (160) and the electrical box (20), the support rod (152) positioned against an outer edge of the second elongated member, wherein the support rod (152) supports at least a portion of weight of the support bracket (150) above at least one of the elongated members;

wherein the support rod is positioned diagonally over a longitudinal axis of the first and second elongated members.

2. The mounting assembly according to claim 1 wherein the plurality of perpendicular extensions are positioned on diagonally opposing sides of the support bracket.

3. The mounting assembly according to claim 2 wherein each perpendicular extension is positioned flush against a side wall of one of the elongated members.

4. The mounting assembly according to claim 3 wherein, the planar surface includes a plurality of planar extensions for affixing the support rod to the support bracket.

5. The mounting assembly according to claim 4 wherein a first planar extension is located on a first side of the support bracket and a second planar extension is located on a second end of the support bracket and the first and second planar extensions are positioned on diagonally opposing sides of the support bracket.

6. The mounting assembly according to claim 5 wherein the first and second planar extensions are located on opposing diagonal sides from the support rod.

7. The mounting assembly according to claim 1 wherein each clamp is positioned and deformed within an inner lip of one of the elongated members.

8. The mounting assembly according to claim 1 further comprising height gages affixed to the end mounts to accommodate electrical boxes of various depths.

9. The mounting assembly according to claim 1 wherein each end mount includes a receiving section having an orifice for receiving a screw used for affixing the end mount to a support, the receiving section having an insert to retain a screw during an installation process.

10. A support bracket (150) for supporting an electrical box (20), the support bracket comprising:
a planar surface (160) and a slot (162) having a plurality of extended clamps (164, 166);
a plurality of perpendicular extensions (156, 158); and
a support rod (152) affixed to the planar surface (160) and an electrical box (20), the support rod (152) positioned against an outer edge of an outer elongated member (112) of a mounting assembly (100), wherein the support rod (152) supports at least a portion of weight of the support bracket (150) above the elongated member (112);
wherein the support rod is positioned diagonally over a longitudinal axis of the first and second elongated members.

11. The support bracket according to claim 10 wherein the plurality of perpendicular extensions are positioned on diagonally opposing sides of the support bracket.

12. The support bracket according to claim 11 wherein each perpendicular extension is positioned to be flush against a side wall of the elongated member of a mounting assembly.

13. The support bracket according to claim 10 wherein the planar surface includes a plurality of planar extensions for affixing the support rod to the support bracket.

14. The support bracket according to claim 13 wherein a first planar extension is located on a first side of the support bracket and a second planar extension is located on a second end of the support bracket and the first and second planar extensions are positioned on diagonally opposing sides of the support bracket.

* * * * *